United States Patent
Bastide et al.

(10) Patent No.: US 11,454,509 B2
(45) Date of Patent: Sep. 27, 2022

(54) ALERT SYSTEM FOR ENVIRONMENTAL CHANGES

(71) Applicant: International Business Machines Corporation, Armonk, NY (US)

(72) Inventors: Paul R. Bastide, Ashland, MA (US); Piyush Madan, Boston, MA (US); Vishrawas Gopalakrishnan, Cambridge, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 16/293,625

(22) Filed: Mar. 5, 2019

(65) Prior Publication Data

US 2020/0284609 A1 Sep. 10, 2020

(51) Int. Cl.
*G01C 21/36* (2006.01)
*G08G 1/0968* (2006.01)
(Continued)

(52) U.S. Cl.
CPC ..... *G01C 21/3647* (2013.01); *G01C 21/3617* (2013.01); *G06V 10/751* (2022.01);
(Continued)

(58) Field of Classification Search
CPC ............ G01C 21/3647; G01C 21/3617; G06K 9/00201; G06K 9/00805; G06K 9/6202; G08G 1/096833
See application file for complete search history.

(56) References Cited

U.S. PATENT DOCUMENTS 7,792,328 B2 * 9/2010 Albertson ............. B60W 40/09 701/1
8,605,947 B2 12/2013 Zhang et al.
(Continued)

FOREIGN PATENT DOCUMENTS

CN 105973231 A * 9/2016
CN 106406784 A * 2/2017
(Continued)

OTHER PUBLICATIONS

"The Hidden Distractions Behind the Wheel", retrieved from [https://www.idrivesafely.com/defensive-driving/trending/hidden-distractions-behind-wheel] on Feb. 19, 2019.

*Primary Examiner* — Redhwan Mawari
(74) *Attorney, Agent, or Firm* — L. Jeffrey Kelly

(57) ABSTRACT

For locations along a route a user will be traveling, the alert system for environmental changes compares first and second sets of images associated with first and second timestamps, respectively. The alert system determines degrees of environmental changes for the locations based on the comparisons. The alert system then generates and sends an alert to a user device. In determining the degrees of environment changes, the alert system retrieves first and second set of images matching a given location and associated with first and second timestamps. The alert system identifies first and second sets of objects and extracts first and second sets of attributes for the first and second sets of images. The alert system compares the first and second sets of attributes and the first and second set of objects, and determines a given degree of environmental changes at the given location based on the comparisons.

17 Claims, 4 Drawing Sheets

(51) Int. Cl.
  *G06V 10/75* (2022.01)
  *G06V 20/58* (2022.01)
  *G06V 20/64* (2022.01)

(52) U.S. Cl.
  CPC .............. *G06V 20/58* (2022.01); *G06V 20/64* (2022.01); *G08G 1/096833* (2013.01)

(56) References Cited

U.S. PATENT DOCUMENTS

| | | | |
|---|---|---|---|
| 9,239,244 B1 | 1/2016 | Chen | |
| 9,607,243 B1 * | 3/2017 | Brualla | G06K 9/6255 |
| 2007/0063824 A1 | 3/2007 | Gaddy et al. | |
| 2007/0262863 A1 * | 11/2007 | Aritsuka | H04B 17/27 |
| | | | 370/254 |
| 2012/0213404 A1 * | 8/2012 | Steiner | G06V 20/30 |
| | | | 382/218 |
| 2014/0139667 A1 * | 5/2014 | Kang | H04N 5/23219 |
| | | | 348/143 |
| 2015/0235110 A1 * | 8/2015 | Curtis | G06V 20/30 |
| | | | 382/224 |
| 2016/0246304 A1 * | 8/2016 | Canoy | G05D 1/0816 |
| 2016/0321513 A1 * | 11/2016 | Mitti | G06V 20/63 |
| 2018/0128622 A1 * | 5/2018 | Alataas | G06F 3/167 |
| 2018/0356248 A1 * | 12/2018 | Eno | G01C 21/3679 |
| 2019/0265058 A1 * | 8/2019 | Lear | G01C 21/3476 |

FOREIGN PATENT DOCUMENTS

| | | | | |
|---|---|---|---|---|
| DE | 102016107767 A1 * | 11/2016 | ......... | G06F 16/5846 |
| FR | 3020705 A1 * | 11/2015 | ............. | B61L 25/08 |
| GB | 2425858 A * | 8/2006 | | |
| GB | 2425858 A * | 11/2006 | ............ | G01C 21/32 |
| JP | 5853693 B2 * | 2/2016 | | |
| KR | 20140002969 A * | 1/2014 | | |
| RU | 2748763 C1 * | 5/2021 | | |
| WO | WO-2006039389 A2 * | 4/2006 | ......... | G01C 21/3647 |
| WO | WO-2015138181 A1 * | 9/2015 | ........... | A63F 13/213 |
| WO | 2017149046 A1 | 9/2017 | | |

* cited by examiner

ALERT SYSTEM FOR ENVIRONMENTAL CHANGES

BACKGROUND

The environment surrounding people change from time to time for various reasons. For example, the environment may change based on the weather, building construction, or road construction. When a user is familiar with the environment at a particular time, the user would not be aware of distractions or obstructions that has since been introduced into the environment. These distractions or obstructions can lead to problems when the user performs certain actions, such as driving or walking.

SUMMARY

Disclosed herein is a method for managing an alert system for environmental changes, and a computer program product and system as specified in the independent claims.

Embodiments of the present invention are given in the dependent claims. Embodiments of the present invention can be freely combined with each other if they are not mutually exclusive.

According to an embodiment of the present invention, when an alert system determines that a current location of a user device triggers an alert process, the alert system determines a route on which a user of the user device will be traveling. For a set of locations along the route, the alert system compares a first set of images associated with a first timestamp and a second set of images associated with a second timestamp. The alert system determines degrees of environmental changes for the set of locations based on the comparison and determines whether the degrees of environmental changes trigger an alert. When the degrees of environmental changes trigger the alert, the alert system generates the alert and send the alert to the user device.

In one aspect of the present invention, for a given location of the set of locations, in the determination of the degrees of environment changes, the alert system retrieves the first set of images associated with a first location matching the given location and associated with the first timestamp and retrieves the second set of images associated with a second location matching the given location and associated with the second timestamp. The alert system identifies a first set of objects in the first set of images and a second set of objects in the second set of images and extracts a first set of attributes for the first set of images and a second set of attributes for the second set of images. The alert system compares the first set of attributes with the second set of attributes and the first set of objects with the second set of objects. The alert system determines a given degree of environmental changes at the given location based on the comparison.

DETAILED DESCRIPTION

Figure 1:
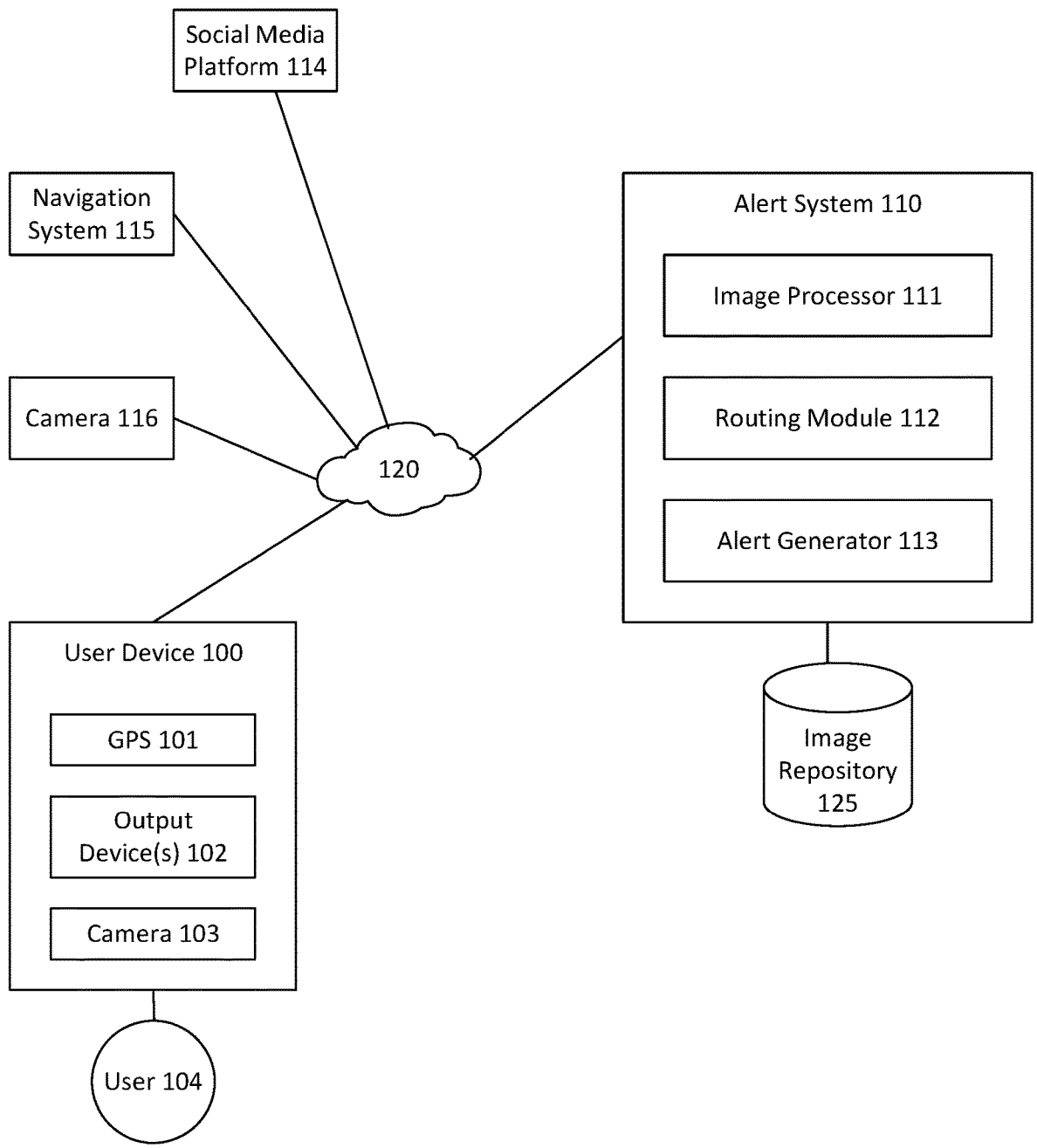
FIG. 1 illustrates a computing environment comprising an alert system according to some embodiments.

FIG. 1 illustrates a computing environment comprising an alert system according to some embodiments. The computing environment includes a user device 100 and an alert system 110 configured to communication over a network 120. The user device 110 includes a global position system 101 from which a location of the user device 100 may be ascertained. The user device 110 further includes one or more output devices 102 for playing visual or audio outputs, such as a display and/or a speaker. The user device 110 further includes a camera 103, which can capture images of the environment of the user's current location. The alert system 110 includes an image processor 111, a routing module 112, and an alert generator 113. The alert system 110 is configured to obtain or receive images from various sources, where the images capture the environment at various locations at specific points in time. The sources can include any with which the alert system 110 has authorization to obtains the images, or the sources provide images that are publicly available. Example sources can include social media platforms 114, navigation systems 115 (e.g. Google Maps™), and cameras 116 (e.g. GoPro™). The images can further include image taken by the camera 103 at the user device 100. The image processor 111 processes the images, as described further below, and stores the processed images in an image repository 125. The routing module 112 is configured to determines a route the user 104 will be traveling, as described further below. The alert generator 113 determines the degrees of environmental change for various locations along the route and sends alerts to the user device 100 when the degrees of environmental change triggers the alerts. In some embodiments, the degrees of environmental change for the various locations are determined prior to the user 104 traveling to the locations such that the alerts are played by the user device 100 before the user 104 reaches the locations. In some embodiments, the degree of environmental change is determined for the user's current location, and the alert is sent while the user 104 is at the current location. In some embodiments, each image obtained by the image processor 111 is associated with a location and a timestamp. In some embodiments, the location includes a directionality, such as a direction the camera was facing when the image was captured. The timestamp records the time and date at which the image was captured. The image and its associated location and timestamp are stored in the image repository 125.

Figure 2:
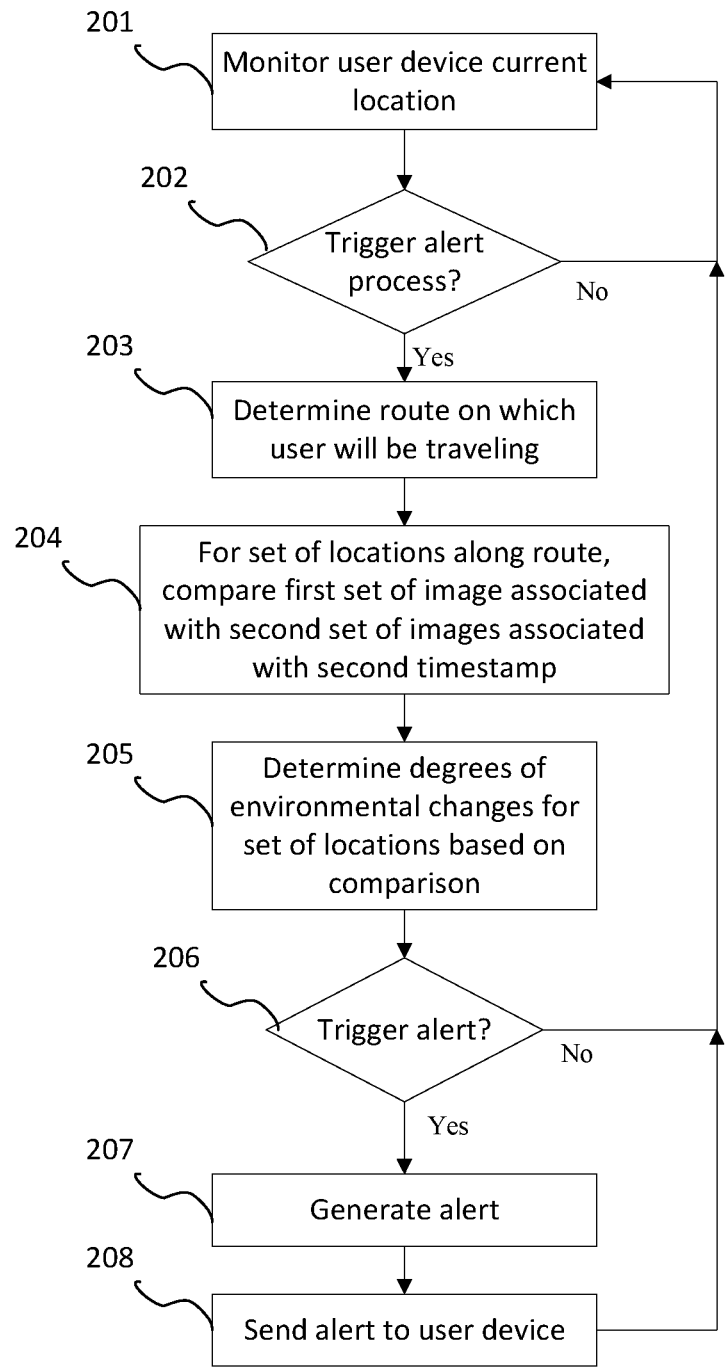
FIG. 2 illustrates a method for managing an alert system for environmental changes according to some embodiments.

FIG. 2 illustrates a method for managing an alert system for environmental changes according to some embodiments. The alert system 110 monitor's the current location of the user device 100 (201), for example, via the global positioning system (GPS) 101. The alert system 110 determines whether the user device current location triggers the alert process (202). When the alert process is triggered, the routing module 112 determines a route on which the user 104 will be traveling (203). In some embodiments, with authorization from the user 104, the alert system 110 stores a history of user routes associated with locations and timestamps. The routing module 112 obtains the user device current location and the current timestamp. When the user device current location matches a location associated with a user route in the history, and the current timestamp is of the same time of day as the timestamp associated with the user route, the alert system 110 selects the user route as the route the user will be traveling. For example, assume that the history includes the user traveling a given route, from the user's home location to the work location, between 6 am and 7:00 am most weekdays. When the user device current location matches the user's home location and the current time is between 6 am and 7:00 am, the alert system 110 determines that the user will be traveling the given route.

Alternatively, the alert process is triggered when the user manually inputs a route, such as when entering a destination location in a navigation application on the user device 100.

Upon determining the route, for a set of locations along the route, the alert generator 113 compares a first set of images associated with a first timestamp with a second set of images associated with a second timestamp (204). The alert generator 113 determines the degrees of environmental changes for the locations based on the comparisons (205). The degrees of environmental changes for a given location represents how much the environment at the given location has changed between the first and second timestamps. In some embodiments, the first timestamp is a last time that the user 104 entered the given location, and the second timestamp is the current time or a time proximate to the current time. In some embodiments, when no route information is available, the alert system 110 determines the degrees of environmental change for the user device current location and/or the destination location if known.

Figure 3:
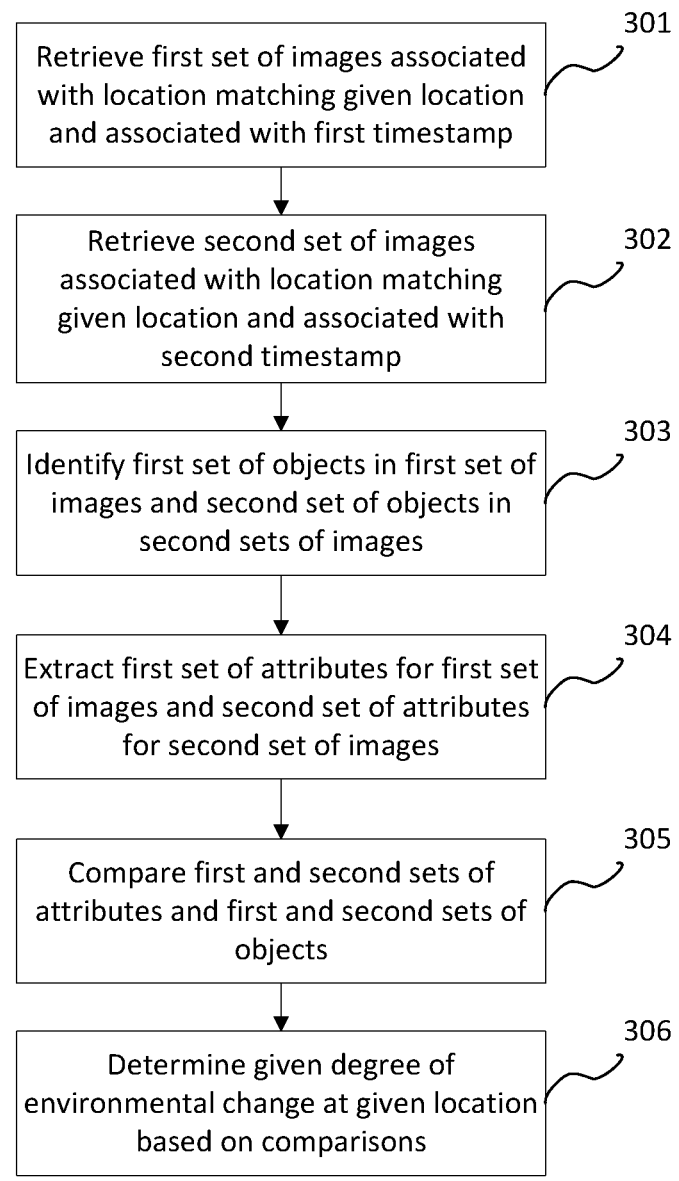
FIG. 3 illustrates, in more detail, the determination of the degree of environmental changes for a location according to some embodiments.

FIG. 3 illustrates, in more detail, the determination of the degree of environmental changes for a location according to some embodiments. For each given location in the set of locations, the alert generator 113 retrieves a first set of images from the image repository 125 associated with a location matching the given location, where the first set of images is associated with a first timestamp (301). The alert generator 113 further retrieves a second set of images from the image repository 125 associated with a location that also matches the given location, where the second set of images is associated with a second timestamp (302). The first and second sets of images are of the same location but taken at two different points in time. In some embodiments, the first or second sets of images includes images from different sources, which can include images captured by the user device 100 at the first or second timestamps. The alert generator 113 applies an object recognition technique to identify a first set of objects in the first set of images and a second set of objects in the second set of images (303). In some embodiments, a minimum size is configured such that only objects with at least the minimum size are identified. In this manner, smaller objects that are less likely to cause a distraction or noticed by a user are eliminated from further processing, saving computing resources. The alert generator 113 further extracts a first set of attributes for the first set of images and a second set of attributes for the second set of images (304). In some embodiments, each set of images is represented as a matrix, where attributes of color, intensity, depth, etc. is extracted for each section in the matrix. The alert generator 113 then compares the first set of attributes with the second sets of attributes and the first set of objects with the second set of objects (305). The alert generator 113 aggregates the differences identified between the first and second sets of attributes and the first and second sets of objects to determine a given degree of environmental changes at the given location (306). For example, assume that a hill is an object identified in the first set of images, and the attributes indicate that the dominate color is green. Assume that in the second set of images, a hill is also identified as an object, but the attributes for the section that includes the hill indicate that the dominate colors are brown and white. In another example, assume that a building is an object identified in the second set of images, while no building is identified in the same section in the first set of images. In another example, assume that a building identified in the first set of images has a sign for a pizzeria, while the same building identified in the second set of images has a sign for a sandwich shop. These differences are aggregated with other differences found between the first and second sets of images to determine the degree of environment changes for the given location.

Returning to FIG. 2, the alert generator 113 then determines whether the degree of environmental changes triggers an alert (206). In some embodiments, a model of human visual capability is used to determine the likelihood that the degree of environment changes would be distracting to a user. In some embodiments, the user's current activity (such as driving, walking, etc.) is also determined by the alert system 110, where the current activity is a factor in the model. For example, the model indicates that the degree of environmental changes is distracting when the user is driving but not when the user is walking. When the alert is triggered, the alert generator 113 generates an alert (207), which is then sent to the user device 100 (208) to be played for the user 104. The alert can be a visual alert, an auditory alert, or a combination of visual and auditory alerts. Optionally, the alert generator 113 considers the current activity of the user 104 and composes the alert accordingly. In some embodiments, the alert is played prior to the user 104 reaching the location. In other embodiments, the alert is played when the user 104 reaches the location. For example, when a building is identified in the second set of images but is not in the first set of images, the model indicates a high likelihood of distraction to the user. The alert generator 113 determines that the user is driving, and in response, generates an audio alert, instead of a visual alert, to inform the user that a new building exists at the given location. Optionally, the alert may include directional information, such as alerting the user to a new building on the right side of the street when the user is traveling in one direction, and on the left side of the street when the user is traveling in the opposite direction.

Figure 4:
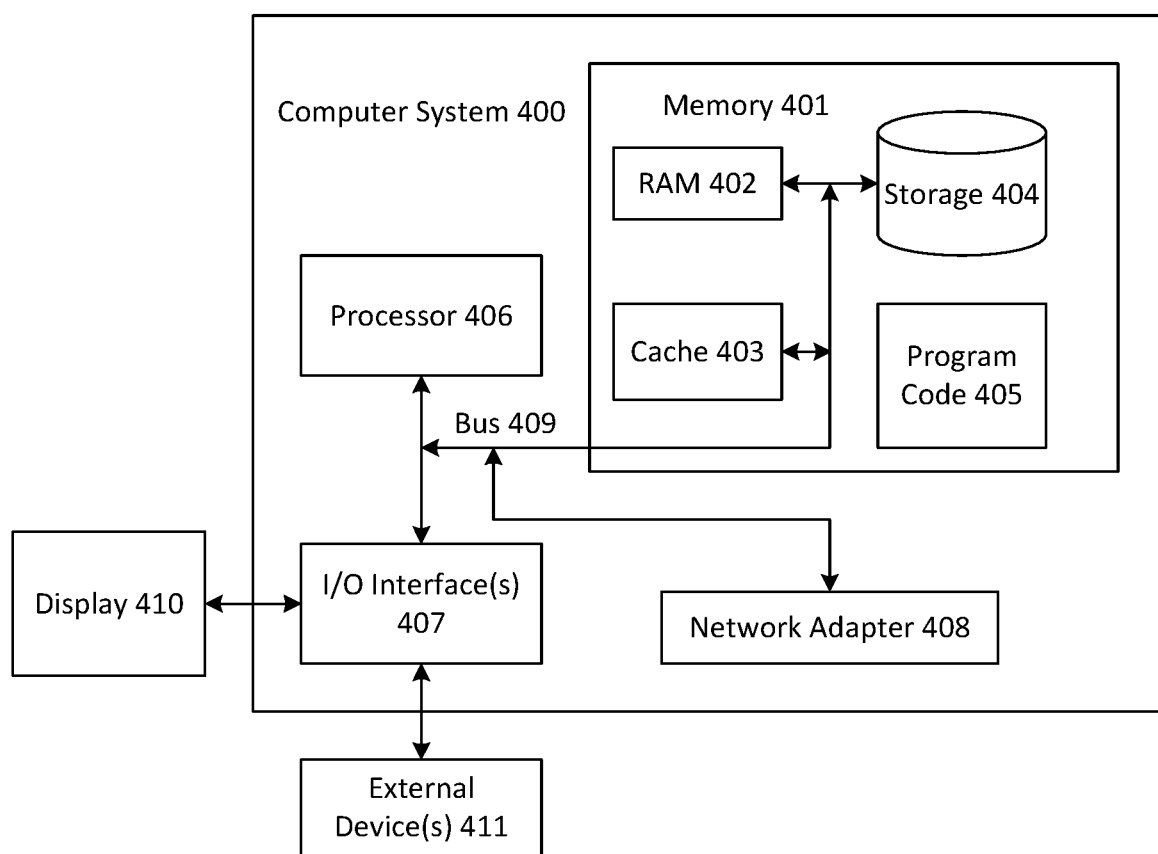
FIG. 4 illustrates a computer system according to some embodiments.

FIG. 4 illustrates a computer system according to some embodiments. One or more of the computer system implements the user device 100, the alert system 110, and the other components of the computing environment illustrated in FIG. 1. The computer system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiment of the present invention when executed by the processor 406. The computer system 400 may also communicate with one or more external devices 411, such as a display 410, via I/O interfaces 407. The computer system 400 may communicate with one or more networks via network adapter 408.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing an alert system for environmental changes, comprising:

in response to determining a current location of a user device triggers an alert process, determining, by an alert system, a route on which a user of the user device will be traveling;

determining, by the alert system, environmental changes for each location of a plurality of locations along the route by comparing a first image of each location of the plurality of locations along the route with a second image of each location of the plurality of locations along the route, wherein the first image and the second image were captured at different times, wherein determining the environmental changes for each location of a plurality of locations along the route comprises:

identifying, by the alert system, a first set of objects in the first image and a second set of objects in the second image, wherein the first set of objects identified in the first image and the second set of objects identified in the second image consist of objects present in the landscape and are each equal to or greater than a minimum size;

dividing, by the alert system, each of the first image and the second image into a matrix comprising multiple sections;

extracting, by the alert system, a first set of attributes for each matrix section for the first image and a second set of attributes for each matrix section for the second image, wherein both the first set of attributes and the second set of attributes comprise a color, an intensity and a depth; and comparing, by the alert system, the first set of attributes with the second set of attributes and the first set of objects with the second set of objects; and in response to the determined environmental changes for at least one location of the plurality of locations along the route exceeding a threshold, generating, by the alert system, an alert and sending the alert to the user device prior to the user arriving at the at least one location.

2. The method of claim 1, further comprising:
identifying, by the alert system, the route from the plurality of routes based on the user's current location and a current time stamp, wherein a starting point of the route matches the user's current location and a timeframe the route matches the current time stamp.

3. The method of claim 1, wherein generating and sending the alert is further based on:
determining, by the alert system, a current activity of the user; and
determining, by the alert system, the environmental changes would be distracting to the user during the user's current activity.

4. The method of claim 1, wherein the alert comprises a visual alert, an audio alert, or some combination thereof.

5. The method of claim 1, wherein the alert comprises directional information identifying the determined environmental changes.

6. The method of claim 1, wherein generating and sending the alert comprises:
selecting, by the alert system, an alert type based on the user's current activity.

7. A method for managing an alert system for environmental changes, comprising:
in response to determining a current location of a user device triggers an alert process, determining, by an alert system, a route on which a user of the user device will be traveling;
receiving, by the alert system from a repository, a first image and a second image for each location of a plurality of locations along the route, wherein the first image and the second image were captured at different times, where in the first image and the second image are from different sources;

comparing, by the alert system, the first image and the second image for each location of the plurality of locations along the route to determine environmental changes for each location of the plurality of locations along the route, wherein determining the environmental changes for each location of a plurality of locations along the route comprises:

identifying, by the alert system, a first set of objects in the first image and a second set of objects in the second image, wherein the first set of objects identified in the first image and the second set of objects identified in the second image consist of objects present in the landscape and are each equal to or greater than a minimum size;

dividing, by the alert system, each of the first image and the second image into a matrix comprising multiple sections;

extracting, by the alert system, a first set of attributes for each matrix section for the first image and a second set of attributes for each matrix section for the second image, wherein both the first set of attributes and the second set of attribute comprise a color, an intensity and a depth; and comparing, by the alert system, the first set of attributes with the second set of attributes and the first set of objects with the second set of objects; and in response to the determined environmental changes for at least one location of the plurality of locations along the route exceeding a threshold, generating, by the alert system, an alert and sending the alert to the user device prior to the user arriving at the at least one location.

8. The method of claim 7, further comprising:
identifying, by the alert system, the route from the plurality of routes based on the user's current location and a current time stamp, wherein a starting point of the route matches the user's current location and a timeframe the route matches the current time stamp.

9. The method of claim 7, wherein generating and sending the alert is further based on:
determining, by the alert system, a current activity of the user; and
determining, by the alert system, the environmental changes would be distracting to the user during the user's current activity.

10. The method of claim 7, wherein the alert comprises directional information identifying the determined environmental changes.

11. The method of claim 7, wherein generating and sending the alert comprises:
selecting, by the alert system, an alert type based on the user's current activity, wherein the alert type comprises a visual alert, an audio alert, or some combination thereof.

12. A method for managing an alert system for environmental changes, comprising:
determining, by the alert system, that a current location of a user device triggers an alert process;
in response to determining the current location of the user device triggers the alert process, determining, by the alert system, a route on which a user of the user device will be traveling;
receiving, by the alert system, a first set of images and a second set of images for each location of a set of locations along the route, wherein the first set of images are associated with a first time stamp and the second set of images are associated with a second time stamp;

comparing, by the alert system, the first set of images associated with the first timestamp with the second set of images associated with the second timestamp, wherein the first set of images and the second set of images are retrieved from an image repository;

prior to the user traveling to each location and based on comparing the first set of images with the second set of images, determining, by the alert system, environmental changes for each location of the set of locations, wherein determining the environment changes for each location of the set of locations comprises:

identifying, by the alert system, a first set of objects in the first set of images and a second set of objects in the second set of images, wherein the first set of objects identified in the first set of images and the second set of objects identified in the second set of images are each equal to or greater than a minimum size;

extracting, by the alert system, a first set of attributes for the first set of images and a second set of attributes for the second set of images; and comparing, by the alert system, the first set of attributes with the second set of attributes and the first set of objects with the second set of objects;

determining, by the alert system, whether the environmental changes trigger an alert; and in response to determining the environmental changes do trigger the alert, generating, by the alert system, the alert and sending the alert to the user device prior to the user arriving at each location of the set of locations, respectively.

13. The method of claim 12, wherein determining the route on which the user of the user device will be traveling comprises:

obtaining, by the alert system, a current timestamp and the current location of the user device;

comparing, by the alert system, a plurality of routes in a history of user routes with the current timestamp and the current location;

identifying, by the alert system, a single route from the plurality of routes based on the user's current location and the current time stamp, wherein a starting point of the single route matches the user's current location and a timeframe the single route matches the current time stamp; and selecting, by the alert system, the single route as the route on which the user of the user device will be traveling.

14. The method of claim 12, wherein comparing the first set of attributes with the second set of attributes and the first set of objects with the second set of objects and determining the given degree of environmental changes comprise:

identifying, by the alert system, a plurality of differences between the first set of attributes and the second set of attributes and between the first set of objects and the second set of objects; and aggregating, by the alert system, the plurality of differences to determine the given degree of environmental changes at the given location.

15. The method of claim 12, wherein determining whether the environmental changes trigger the alert further comprises:

determining, by the alert system, a current activity of the user; and determining, by the alert system, the likelihood that the environmental changes would be distracting to the user during the current activity as a factor in the model of human visual capability.

16. The method of claim 12, wherein the alert comprises directional information identifying the determined environmental changes.

17. The method of claim 12, wherein generating and sending the alert comprises:

selecting, by the alert system, an alert type based on the user's current activity, wherein the alert type comprises a visual alert, an audio alert, or some combination thereof.

* * * * *